(12) United States Patent
Fujimoto et al.

(10) Patent No.: US 9,938,443 B2
(45) Date of Patent: Apr. 10, 2018

(54) MAGNESIUM OXIDE MATERIAL, THERMALLY CONDUCTIVE FILLER AND THERMALLY CONDUCTIVE RESIN COMPOSITION CONTAINING THE SAME, AND METHOD OF PRODUCING MAGNESIUM OXIDE MATERIAL

(71) Applicant: UBE MATERIAL INDUSTRIES, LTD., Ube-shi, Yamaguchi (JP)

(72) Inventors: Masayuki Fujimoto, Ube (JP); Yuzo Kato, Ube (JP); Seiji Noguchi, Ube (JP)

(73) Assignee: UBE MATERIAL INDUSTRIES, LTD., Ube-shi, Yamaguchi (JP)

( * ) Notice: Subject to any disclaimer, the term of this patent is extended or adjusted under 35 U.S.C. 154(b) by 0 days.

(21) Appl. No.: 15/118,592

(22) PCT Filed: Feb. 12, 2015

(86) PCT No.: PCT/JP2015/053744
§ 371 (c)(1),
(2) Date: Aug. 12, 2016

(87) PCT Pub. No.: WO2015/122427
PCT Pub. Date: Aug. 20, 2015

(65) Prior Publication Data
US 2017/0044417 A1 Feb. 16, 2017

(30) Foreign Application Priority Data
Feb. 14, 2014 (JP) .................................. 2014-26591

(51) Int. Cl.
*B32B 5/16* (2006.01)
*C09K 5/14* (2006.01)
(Continued)

(52) U.S. Cl.
CPC ................. *C09K 5/14* (2013.01); *C01F 5/02* (2013.01); *C01F 5/04* (2013.01); *C08K 3/22* (2013.01);
(Continued)

(58) Field of Classification Search
CPC .......... C08K 3/16; C08K 3/222; C08K 5/541; Y10T 428/2991; Y10T 428/2993; Y10T 428/2995
(Continued)

(56) References Cited

U.S. PATENT DOCUMENTS 3,582,407 A * 6/1971 Steger ...................... C09D 1/00
106/286.6
2001/0024728 A1 9/2001 Kamitani et al.
(Continued)

FOREIGN PATENT DOCUMENTS

| CN | 1114503 A | 1/1996 |
|---|---|---|
| JP | 2003-34522 A | 2/2003 |

(Continued)

OTHER PUBLICATIONS

International Search Report dated Apr. 14, 2015, issued in counterpart International Application No. PCT/JP2015/053744 (2 pages).
(Continued)

*Primary Examiner* — Hoa T Le
(74) *Attorney, Agent, or Firm* — Westerman, Hattori, Daniels & Adrian, LLP (57) ABSTRACT

A magnesium oxide material includes a magnesium oxide powder treated with a halogen compound and a silane coupling agent. A method of producing a magnesium oxide material includes a step including preparing a magnesium oxide powder, a halogen compound treatment step including subjecting the magnesium oxide powder to a surface treatment with a halogen compound, and a silane coupling agent
(Continued)

treatment step including subjecting the magnesium oxide powder to a surface treatment with a silane coupling agent.

14 Claims, 2 Drawing Sheets

(51) Int. Cl.
  C01F 5/02     (2006.01)
  C08K 9/06     (2006.01)
  C08L 101/00   (2006.01)
  C09C 1/02     (2006.01)
  C01F 5/04     (2006.01)
  C08K 3/22     (2006.01)
  C09C 3/12     (2006.01)

(52) U.S. Cl.
  CPC ............ C08K 9/06 (2013.01); C08L 101/00 (2013.01); C09C 1/028 (2013.01); C09C 3/12 (2013.01); *C01P 2004/61* (2013.01); *C01P 2006/12* (2013.01); *C01P 2006/32* (2013.01); *C01P 2006/40* (2013.01); *C01P 2006/80* (2013.01); *C08K 2003/222* (2013.01)

(58) Field of Classification Search
  USPC .................................................. 428/403–406
  See application file for complete search history.

(56) References Cited

U.S. PATENT DOCUMENTS

| | | | |
|---|---|---|---|
| 2004/0219087 A1 | 11/2004 | Mohri et al. | |
| 2006/0127669 A1* | 6/2006 | Kogoi | B82Y 30/00 428/403 |
| 2007/0088095 A1* | 4/2007 | Tamaki | B29C 71/04 522/163 |
| 2007/0184269 A1 | 8/2007 | Kiyokawa et al. | |
| 2008/0174979 A1 | 7/2008 | Furihata et al. | |

FOREIGN PATENT DOCUMENTS

| | | |
|---|---|---|
| JP | 2003-34523 A | 2/2003 |
| JP | 2007-70608 A | 3/2007 |
| JP | 2008-74683 A | 4/2008 |
| JP | 2009-46355 A | 3/2009 |
| JP | 2010-138067 A | 6/2010 |
| JP | 2011-46760 A | 3/2011 |
| JP | 2012-153552 A | 8/2012 |
| JP | 2006-151778 A | 6/2016 |
| KR | 20130078190 A | 7/2013 |

OTHER PUBLICATIONS

Office Action dated Apr. 5, 2017, issued in counterpart Chinese patent application No. 201580007935.5 (w/ English machine translation; 14 pages).

Chen Shirong et al., Silicone Material, vol. 17, Issue 5, pp. 28-31, published on Dec. 31, 2003 (5 pages; cited in Chinese Office Action dated Apr. 5, 2017).

Office Action dated Nov. 20, 2017, issued in counterpart Korean patent application No. 10-2016-7025328 (w/ English machine translation; 8 pages).

* cited by examiner

MAGNESIUM OXIDE MATERIAL, THERMALLY CONDUCTIVE FILLER AND THERMALLY CONDUCTIVE RESIN COMPOSITION CONTAINING THE SAME, AND METHOD OF PRODUCING MAGNESIUM OXIDE MATERIAL

TECHNICAL FIELD

The present invention relates to a magnesium oxide material, a thermally conductive filler, a thermally conductive filler, a thermally conductive resin composition containing the filler, and a method of producing a magnesium oxide material. More specifically, the present invention relates to a magnesium oxide material and a thermally conductive filler that have high resistance to hydration, a thermally conductive resin composition containing the filler, and a method of producing a magnesium oxide material having high resistance to hydration.

BACKGROUND ART

Magnesium oxide is an inorganic compound with good thermal conductivity, heat resistance, and other properties, and used as a thermally conductive filler to form resin compositions with higher thermal conductivity in combination with a variety of resins. On the other hand, magnesium oxide, which has a relatively high ability to hydrate, can easily absorb water to expand in volume and suffer from cracking and other defects. This has been a barrier to the commercialization of magnesium oxide as a thermally conductive filler. Therefore, a technique to improve water resistance has been demanded for the use of magnesium oxide as a thermally conductive filler.

For example, there is known a technique of improving water resistance by a process that includes coating the surface of a magnesium oxide powder with silica or other materials, then baking the powder to form a layer of a complex oxide such as forsterite ($Mg_2SiO_4$), and further performing a phosphoric acid treatment to form a magnesium phosphate compound layer (see, for example, Patent Literature 1). There is also known a technique in which the surface after the phosphoric acid treatment is further treated with an organosilicate, so that an organosilicate coating layer is formed to improve water resistance and prevent alkali leaching (see, for example, Patent Literature 2).

CITATION LIST

Patent Literatures

Patent Literature 1: JP 2006-151778 A (see, for example, claim 1 and paragraph 0019)
Patent Literature 2: JP 2008-74683 A (see, for example, claim 1 and paragraph 0019)

SUMMARY OF INVENTION

Technical Problem

Unfortunately, the technique disclosed in Patent Literature 2 has a problem in that it needs to perform three treatments: the complex oxide layer-forming treatment, the magnesium phosphate compound layer-forming treatment, and the organosilicate coating layer-forming treatment, and thus is costly. There is also a problem in that the relatively large total amount of surface treatment agents added for the three treatments makes the content of magnesium oxide relatively low, which causes a reduction in thermal conductivity. For example, Example 1 of the literature shows that silica is added to magnesium oxide so that a mixing ratio of 10% by mass is achieved, and then 6% by mass of a magnesium phosphate compound and further 5% by mass of ethyl silicate are added, which means that the content of the surface treatment agents is relatively high.

It is an object of the present invention to provide a magnesium oxide material and a thermally conductive filler that have high water resistance even with a low content of surface treatment agents and can be produced with good productivity, and to provide a thermally conductive resin composition containing such a thermally conductive filler and a method of producing such a magnesium oxide material.

Solution to Problem

As a result of intensive studies to achieve the object, the inventors have accomplished the present invention based on the finding that the water resistance of a magnesium oxide powder can be improved by treating the magnesium oxide powder with a halogen compound and a silane coupling agent.

Specifically, an aspect of the present invention is directed to a magnesium oxide material including a product obtained by treating a magnesium oxide powder with a halogen compound and a silane coupling agent.

Another aspect of the present invention is directed to a magnesium oxide material including magnesium oxide and a coating layer that is provided on the surface of the magnesium oxide and includes a halogen compound and a silane coupling agent.

In these aspects, the content of the halogen compound is preferably from 1 to 20,000 ppm.

The magnesium oxide material also preferably shows a mass increase of 25% by mass or less after stored at a temperature of 121° C. and a humidity of 100% for 24 hours, wherein the mass increase is expressed by formula (1): mass increase={(an increase in the mass of the magnesium oxide material after the storage)/(the mass of the magnesium oxide material before the storage)}×100(%).

Another aspect of the present invention is directed to a thermally conductive filler including the magnesium oxide material having any of the features stated above.

Another aspect of the present invention is directed to a thermally conductive resin composition including a resin and the thermally conductive filler mixed in the resin.

A further aspect of the present invention is directed to a method of producing a magnesium oxide material, the method including: a step including preparing a magnesium oxide powder; a halogen compound treatment step including subjecting the magnesium oxide powder to a surface treatment with a halogen compound; and a silane coupling agent treatment step including subjecting the magnesium oxide powder to a surface treatment with a silane coupling agent.

In this method, the silane coupling agent treatment step is preferably performed after the halogen compound treatment step. More preferably, the halogen compound treatment step and the silane coupling agent treatment step are performed simultaneously.

Advantageous Effects of Invention

The present invention makes it possible to provide a magnesium oxide material and a thermally conductive filler that have high water resistance even with a low content of surface treatment agents and can be produced with good productivity and to provide a thermally conductive resin composition containing such a thermally conductive filler and a method of producing such a magnesium oxide material.

DESCRIPTION OF EMBODIMENTS

1. Magnesium Oxide Material (Thermally Conductive Filler)

The magnesium oxide material of the present invention (hereinafter simply referred to as "the magnesium oxide material") includes a product obtained by treating a magnesium oxide powder as a raw material with a halogen compound and a silane coupling agent. In another aspect, the magnesium oxide material of the present invention includes magnesium oxide and a coating layer that is provided on the surface of the magnesium oxide and includes a halogen compound and a silane coupling agent. The thermally conductive filler of the present invention (hereinafter simply referred to as the "thermally conductive filler") includes the magnesium oxide material obtained after the treatment. Hereinafter, the magnesium oxide material and the thermally conductive filler will be described in detail.

(1) Magnesium Oxide Powder (Raw Material)

The magnesium oxide powder has high thermal conductivity and functions as a heat-conducting medium. The magnesium oxide powder can be obtained by a method of oxidizing metallic magnesium by burning, a method of thermally decomposing magnesium hydroxide or magnesium carbonate by baking, or other methods. The magnesium hydroxide may be, for example, a product obtained by forming a precipitate by reaction between calcium hydroxide and a magnesium salt in seawater. The magnesium carbonate may be, for example, derived from a magnesite ore. A highly-crystalline magnesium oxide powder obtained by grinding electro-melted magnesium oxide and classifying the resulting particles may also be used. There is no limitation on the temperature at which magnesium oxide is baked. Any of a low-temperature baked product, a high-temperature baked product, or an electro-melted product may be used.

The particles in the magnesium oxide powder may have any appropriate shape, such as spheres, polyhedrons such as cubes, rectangular solids, octahedrons, or tetradecahedrons, indeterminate shapes, or fibrous shapes.

Specifically, the magnesium oxide powder preferably has an average particle size in the range of 0.1 to 200 μm, more preferably in the range of 0.5 to 50 μm, as calculated from the BET specific surface area. If the particle size is too large, the particles may have an adverse effect on appearance or surface smoothness when mixed in resins or other materials. Too small a particle size may degrade hydration resistance and thus is not preferred.

The average particle size is the value calculated from the BET specific surface area using formula (2) below. The average particle size calculated using the formula below is the sphere-equivalent average particle diameter, which specifically means the diameter of a sphere having the same surface area as the particle.

Average particle size (μm)=6/($S \times \rho$),  Formula (2):

wherein S is the BET specific surface area ($m^2/g$), and $\rho$ is the density ($g/cm^3$) of the magnesium oxide powder, equal to 3.58 $g/cm^3$.

Hereinafter, all average particle sizes refer to those calculated from the BET specific surface area.

The magnesium oxide powder preferably has a purity of 95% by mass or more, more preferably 98% by mass or more, even more preferably 99% by mass or more.

(2) Halogen Compound Treatment

In the present invention, the treatment with a halogen compound (the halogen compound treatment) is performed to improve the water resistance of the magnesium oxide powder by synergism with the treatment with a silane coupling agent (the silane coupling agent treatment) described below. The halogen compound may be appropriately selected, as being more suitable for the treatment temperature, from a fluoride, a chloride, a bromide, and an iodide. The halogen compound may be, for example, magnesium fluoride, aluminum fluoride, strontium fluoride, barium fluoride, calcium fluoride, ammonium fluoride, magnesium chloride, aluminum chloride, strontium chloride, barium chloride, calcium chloride, ammonium chloride, magnesium bromide, aluminum bromide, strontium bromide, barium bromide, calcium bromide, ammonium bromide, magnesium iodide, aluminum iodide, strontium iodide, barium iodide, calcium iodide, ammonium iodide, fluoroboric acid, acidic ammonium fluoride, hydrofluosilicic acid, ammonium fluorosilicate, or zinc fluoroborate. The halogen compound is preferably a fluoride.

Also as described below in the method of producing the magnesium oxide material (thermally conductive filler), the halogen compound treatment may be performed sequentially before or after the silane coupling agent treatment, or the two treatments may be performed simultaneously. When the halogen compound treatment and the silane coupling agent treatment are performed sequentially, it is particularly preferred to perform the halogen compound treatment before the silane coupling agent treatment. When the halogen compound treatment is performed before the silane coupling agent treatment, a halogen compound and magnesium oxide may be baked at a high temperature of 600 to 1300° C. to form a halogen compound-containing magnesium oxide material with a controlled shape. Alternatively, a halogen compound and magnesium oxide may be backed at a low temperature of 50 to 600° C. to form a halogen compound-containing magnesium oxide material, while the shape before the baking is maintained. Also in the process of producing magnesium oxide by subjecting metallic magnesium to gas-phase oxidation, a gaseous halogen compound may be introduced to form a halogen compound-containing magnesium oxide material. Alternatively, a halogen compound-containing magnesium compound capable of producing magnesium oxide upon baking may be baked at a temperature equal to or higher than its decomposition temperature.

When the halogen compound treatment and the silane coupling agent treatment are performed simultaneously, a halogen compound and a silane coupling agent may be simultaneously added to magnesium oxide to be treated, or a gaseous halogen compound may be introduced during the silane coupling agent treatment. When a mixture of a halogen compound and magnesium oxide is heated, the heating time is generally in the range of 1 to 50 hours, preferably in the range of 2 to 25 hours, more preferably in the range of 3 to 10 hours, although it depends on the heating temperature. The heating may be performed using a known heating apparatus such as a box-type electric furnace, a pusher furnace, or a rotary kiln.

The content of the halogen compound is generally in the range of 1 to 20,000 ppm by mass, preferably in the range of 10 to 10,000 ppm by mass, more preferably in the range of 50 to 5,000 ppm by mass, based on the total mass of the magnesium oxide material. If the content of the halogen compound is less than 1 ppm by mass, the amount of the halogen compound will be relatively small so that the water resistance-improving effect based on synergism with the silane coupling agent described below will be small. On the other hand, if the content of the halogen compound exceeds 20,000 ppm by mass, the thermally conductive filler may tend to increase in manufacturing cost and decrease in productivity because a relatively large amount of the halogen compound is used in the treatment.

(3) Silane Coupling Agent Treatment

In the present invention, the treatment with a silane coupling agent (the silane coupling agent treatment) is performed to form a coating layer on the surface of the magnesium oxide powder and thus to improve water resistance. When the magnesium oxide material (thermally conductive filler) is to be kneaded in a resin, the silane coupling agent treatment is also effective in increasing the dispersibility of the magnesium oxide material (thermally conductive filler) in the resin.

The silane coupling agent used in the silane coupling agent treatment may be any of a monomer and an oligomer. Specifically, the silane coupling agent in the form of a monomer may be a compound represented by the structural formula $R_1'_n Si(OR_2)_{4-n}$, wherein n is an integer of 1 to 4, $R_1'$ is a reactive group selected from an amino group, a mercapto group, a vinyl group, an epoxy group, a methacryloxy group, and other groups, $OR_2$ is a group selected from alkoxy groups such as methoxy and ethoxy groups and other groups, and two or more occurrences of $OR_2$ may be the same or different.

Examples of the vinyl group-containing silane coupling agent include vinylsilanes such as vinyl trimethoxysilane and vinyltriethoxysilane. Examples of the amino group-containing silane coupling agent include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, and N-(vinylbenzyl)-2-aminoethyl-3-aminopropyltrimethoxysilane hydrochloride. Examples of the epoxy group-containing silane coupling agent include 2-(3,4-epoxycyclohexyl) ethyltrimethoxysilane, 3-glycidoxypropyltrimethoxysilane, 3-glycidoxypropyltriethoxysilane, 3-glycidoxypropylmethyldimethoxysilane, and 3-glycidoxypropylmethyldiethoxysilane. Examples of the methacryloxy group-containing silane coupling agent include 3-methacryloxypropyltrimethoxysilane, 3-methacryloxypropyltriethoxysilane, 3-methacryloxypropylmethyldimethoxysilane, and 3-methacryloxypropylmethyldiethoxysilane. Examples of the acryloxy group-containing silane coupling agent include 3-acryloxypropyltrimethoxysilane. Examples of the mercapto group-containing silane coupling agent include 3-mercaptopropylmethyldimethoxysilane and 3-mercaptopropyltrimethoxysilane. Other examples of the silane coupling agent include p-styryltrimethoxysilane, 3-ureidopropyltriethoxysilane, 3-chloropropyltrimethoxysilane, bis(triethoxysilylpropyl)tetrasulfide, and 3-isocyanatopropyltriethoxysilane. Among them, vinylsilanes are particularly preferred.

When in the form of an oligomer, the silane coupling agent may be a homo-oligomer of the reactive group-containing monomer or a co-oligomer of the reactive group-containing monomer and an alkoxysilane with no reactive group. Examples of the alkoxysilane with no reactive group include alkyltrialkoxysilane, alkylmethyldialkoxysilane, phenyltrialkoxysilane, phenylmethyldialkoxysilane, and tetraalkoxysilane. The number of carbon atoms in the alkyl group of alkyltrialkoxysilane and alkylmethyldialkoxysilane is preferably in the range of 1 to 18. The alkyl group may be linear, branched, or cyclic. The alkoxysilane with no reactive group is preferably alkyltrialkoxysilane.

The silane coupling agent treatment may be performed by mixing the magnesium oxide powder as a raw material and the silane coupling agent and heating the mixture. The mixing can be performed using a known apparatus such as a Henschel mixer or a mortar. The heating temperature is generally in the range of 50 to 200° C., preferably in the range of 80 to 180° C., more preferably in the range of 100 to 150° C. If the heating temperature is lower than 50° C., the amount of the silane coupling agent deposited on the surface of the magnesium oxide powder will be small so that the water resistance-improving effect will tend to be small. It the heating temperature is higher than 200° C., the silane coupling agent may undergo thermal decomposition, which may tend to reduce water resistance. The heating time is generally in the range of 0.5 to 50 hours, preferably in the range of 1 to 40 hours, more preferably in the range of 2 to 30 hours, although it depends on the heating temperature. The heating may be performed using a known heating apparatus such as a box-type dryer or an electric furnace.

After the silane coupling agent treatment, a coating layer including the deposited or bonded silane coupling agent is formed on the surface of the magnesium oxide powder. The content of the silane coupling agent on the surface of the magnesium oxide powder is generally in the range of 0.1 to 10% by mass, preferably in the range of 0.2 to 8% by mass, more preferably in the range of 0.3 to 6% by mass, based on the total mass of the magnesium oxide material, although it depends on the particle size of magnesium oxide or the added amount of the silane coupling agent. If the content of the silane coupling agent is less than 0.1% by mass, the resulting magnesium oxide material may tend to have lower water resistance. On the other hand, if the content of the silane coupling agent exceeds 10% by mass, the magnesium oxide material may tend to increase in manufacturing cost and decrease in productivity because a relatively large amount of the silane coupling agent is used in the treatment. For details of the silane coupling agent treatment, reference may be made to, for example, JP 2012-153552 A.

When the halogen compound treatment and the silane coupling agent treatment are performed on the magnesium oxide powder in this way, a coating layer including the halogen compound and the silane coupling agent is formed on the surface of the magnesium oxide powder. It is suggested that the halogen compound deposited on the surface of the magnesium oxide powder can facilitate the adsorption of the silane coupling agent onto the surface of the magnesium oxide particles, so that the silane coupling agent can be more effectively bonded to the surface of the particles. In the present invention, the treatment of the magnesium oxide particles with the halogen compound facilitates the formation of silanol groups on the surface of the particles, so that the silane coupling agent can be preferentially bonded to the surface of the particles. This can make the water resistance of the magnesium oxide material significantly higher than that obtained when the silane coupling agent treatment is simply performed. As a result, this eliminates the need to perform a conventional process including three surface treatments with large amounts of three surface treatment agents, and thus enables a magnesium oxide maternal to be produced with high productivity at low cost. In addition, the synergism between the halogen compound and the silane coupling agent can provide higher water resistance even when the added amount of the surface treatment agent is smaller than the conventional amount.

Surface element analysis of the magnesium oxide particles can determine whether a coating layer of the halogen compound and the silane coupling agent is formed on the magnesium oxide particles. For example, the surface of the magnesium oxide particles may be analyzed by energy dispersive X-ray analysis. In this case, if a halogen peak derived from the halogen compound and a silicon peak derived from the silane coupling agent are detected, it can be determined that a coating layer including the halogen compound and the silane coupling agent is formed.

Although the magnesium oxide material may have any average particle size, the average particle size of the magnesium oxide material is preferably in the range of 0.1 to 100 µm, more preferably in the range of 0.5 to 50 µm, even more preferably in the range of 1 to 30 µm, as calculated from the BET specific surface area. If the average particle size is less than 0.1 µm, a thermally conductive resin composition obtained by mixing the particles and a resin may tend to have higher viscosity and inferior handleability. On the other hand, if the average particle size exceeds 100 µm, the particles may have too large a size and thus tend to degrade the appearance of the thermally conductive resin composition. The particle size of the magnesium oxide material may also be controlled by a combination of grinding and classification.

The BET specific surface area of the magnesium oxide material is generally, but not limited to, 0.01 to 20 $m^2/g$, preferably 0.03 to 10 $m^2/g$, more preferably 0.1 to 3 $m^2/g$. If the BET specific surface area is less than 0.01 $m^2/g$, the particle size may be too large, and if the BET specific surface area exceeds 20 $m^2/g$, the surface area may be too large so that the water resistance may tend to be low.

The magnesium oxide material has high water resistance. Specifically, the magnesium oxide material can show a mass increase of 25% by mass or less, preferably 10% by mass or less, more preferably 1% by mass or less, after stored at a temperature of 121° C. and a humidity of 100% for 24 hours, in which the mass increase is the value calculated from formula (1) below, although it depends on the method of producing described later.

Mass increase={(the increase in the mass of the magnesium oxide material after the storage)/ (the mass of the magnesium oxide material before the storage)}×100(%)  Formula (1):

2. Method of Producing Magnesium Oxide Material (Thermally Conductive Filler)

The magnesium oxide material can be produced by performing a step including preparing a magnesium oxide powder, a halogen compound treatment step including subjecting the magnesium oxide powder to a surface treatment with a halogen compound, and a silane coupling agent treatment step including subjecting the magnesium oxide powder to a surface treatment with a silane coupling agent.

The halogen compound treatment step and the silane coupling agent treatment step may be performed simultaneously or sequentially. Specifically, any one of the methods (a), (b), and (c) below may be performed after the step of preparing magnesium oxide.

(a) Performing the halogen compound treatment step and the silane coupling agent treatment step simultaneously.

(b) Performing the halogen compound treatment step and then the silane coupling agent treatment step.

(c) Performing the silane coupling agent treatment step and then the halogen compound treatment step.

Among the methods (a), (b), and (c), the method (a) of performing both steps simultaneously is particularly preferred because it can produce a significantly high improvement in water resistance. In this case, the halogen compound and the silane coupling agent may be added simultaneously or sequentially to the magnesium oxide powder as a raw material and then mixed and heated so that both steps can be performed simultaneously. The heating temperature is generally in the range of 50 to 200° C., preferably in the range of 80 to 180° C., more preferably in the range of 100 to 150° C. The heating time is generally in the range of 0.5 to 50 hours, preferably in the range of 1 to 40 hours, more preferably in the range of 2 to 30 hours, although it depends on the heating temperature. When both steps are simultaneously performed in this way, the mass increase expressed by formula (1) above can be kept at 1% by mass or less, preferably 0.5% by mass or less, more preferably 0.2% by mass or less, although it depends on the method of producing and other conditions, so that the water resistance can be improved considerably.

In this regard, the method (b) of performing the halogen compound treatment step and then the silane coupling agent treatment step is also highly effective, although its effect of improving the water resistance is slightly lower than that of the method (a). Even when the halogen compound treatment is performed after the silane coupling agent treatment (the method (c)), the water resistance can be improved as compared with the case where the silane coupling agent treatment is performed alone.

3. Thermally Conductive Resin Composition

The thermally conductive filler may be mixed in a resin to form a resin composition with improved thermal conductivity. Hereinafter, the thermally conductive resin composition of the present invention (hereinafter simply referred to as the "thermally conductive resin composition") will be described.

The type of the resin used to form the thermally conductive resin composition may be selected, as appropriate, depending on the intended use or other considerations. For example, the resin may be a thermoplastic resin such as an olefin resin or an acrylic resin or a thermosetting resin such as an epoxy resin or a phenolic resin. The content of each component may be as follows. When the total mass of the thermally conductive resin composition is normalized to 100% by mass, the content of the thermally conductive filler may be from 10 to 91 parts by mass, and the content of the resin may be from 9 to 90 parts by mass. If the content of the thermally conductive filler is less than 10 parts by mass, the resulting resin composition may tend to have lower thermal conductivity. If the content of the thermally conductive filler exceeds 91 parts by mass, the relatively high content of the thermally conductive filler may increase the manufacturing cost and tend to have an adverse effect on the properties of the resin.

The thermally conductive resin composition can be produced by kneading the resin and the thermally conductive filler using a known method. The resulting thermally conductive resin composition may be formed into a desired shape by a known method such as extrusion.

The thermally conductive resin composition can be used for a variety of components. In particular, the thermally conductive resin composition is preferably used to form components required to have high thermal conductivity and water resistance. In the field of automobiles, such components include, for example, lamp sockets and a variety of electrical components. In the field of electronics, such components include, for example, heat sinks, die pads, printed circuit boards, semiconductor package components, cooling fan components, pickup components, connectors, switches, bearings, and case housings.

EXAMPLES

Hereinafter, the present invention will be more specifically described with reference to examples, which, however, are not intended to limit the object or scope of the present invention.

(Production of Magnesium Oxide Powder 1)

After 250 g of magnesium oxide obtained by gas-phase oxidation (2000 A, 0.2 µm in average particle size, manufactured by Ube Material Industries, Ltd.) was mixed with 0.1087 g of magnesium chloride hexahydrate and 0.0204 g of magnesium fluoride, the mixture was placed in a heat-resistant container made of alumina. After the heat-resistant container was covered with a lid made of alumina, the mixture was heat-treated in a box-type electric furnace at 1,300° C. for 3 hours, so that magnesium oxide with an average particle size of 2.7 µm was obtained by grain growth.

(Production of Magnesium Oxide Powder 2)

Three hundred and fifty g of magnesium hydroxide obtained from seawater (UD653, 0.1 µm in average particle size, manufactured by Ube Material Industries, Ltd.) was added to a heat-resistant container made of alumina and then heat-treated in a box-type electric furnace at 1,300° C. for 3 hours to yield magnesium oxide with an average particle size of 3.0 µm. The magnesium oxide was then ground with a jet mill to give magnesium oxide with an average particle size of 1.0 µm.

1. Example 1 (Fluorine (500° C.)→Silane Coupling Agent (120° C.) Sequential Treatment)

Sixty g of the magnesium oxide powder 1 (2.7 µm in average particle size) was added to a heat-resistant container made of alumina. A platinum crucible containing 0.0351 g of ammonium fluoride (ACS reagent, ≥98.0%, manufactured by Sigma-Aldrich Corporation) was placed in the heat-resistant container containing the magnesium oxide powder. The heat-resistant container was then covered with a lid. After the heat-resistant container was placed in an electric furnace, the temperature in the furnace was raised to 500° C. at a rate of 240° C./hour and then held for 6 hours. Subsequently, the temperature in the furnace was cooled to room temperature at a rate of 240° C./hour, so that a fluorine-treated magnesium oxide powder was obtained. The fluorine-treated magnesium oxide powder was measured for fluorine content. Table 1 shows the result of the measurement.

TABLE 1

| | Fluorine content (ppm) |
|---|---|
| Example 1 | 290 |
| Example 2 | 810 |
| Example 3 | 1250 |
| Example 4 | 1300 |
| Example 5 | 1300 |
| Example 6 | 1200 |
| Example 7 | 1300 |
| Example 8 | 1200 |
| Comparative Example 1 | 290 |
| Comparative Example 2 | 810 |
| Comparative Example 3 | 1300 |

(1) Measurement of Fluorine Content

According to JIS-K-01023.41, the fluorine content was measured by lanthanum-alizarin complexone absorptiometry.

In a mortar, 0.1 g of vinyl trimethoxysilane (Dynasylan 6490 manufactured by Evonik Degussa Japan Co., Ltd.) was added to 20 g of the fluorine-treated magnesium oxide powder and mixed for 10 minutes. The resulting mixed powder was placed on a magnetic dish and then heat-treated for 18 hours in a dryer kept at 120° C. The resulting fluorine and silane coupling agent-treated magnesium oxide powder (thermally conductive filler) was taken out of the dryer. Table 2 shows the result of the evaluation of its hygroscopicity.

(2) Evaluation of Hygroscopicity

After the mass of a glass beaker (100 mL) was measured (the mass at this time is represented by W1 (g)), about 5 g of the surface-treated magnesium oxide powder was added to the glass beaker, and then the total mass was measured (the mass at this time is represented by W2 (g)). The glass beaker containing the magnesium oxide powder was placed in a pressure cooker tester (PC-242HSR2 manufactured by HIRAYAMA MANUFACTURING CORPORATION) and then subjected to a degradation test at a temperature of 121° C. and a humidity of 100% for 24 hours. After the test, the glass beaker containing the magnesium oxide powder was taken out of the pressure cooker tester. The glass beaker containing the magnesium oxide powder was subjected to drying at 120° C. overnight, then allowed to cool in a desiccator, and then weighed (the mass at this time is represented by W3 (g)). The mass increase of the magnesium oxide powder was calculated from the formula below.

$$\text{Mass increase (\% by mass)} = 100 \times (W3 - W2)/(W2 - W1)$$

2. Example 2 (Fluorine (500° C.)→Silane Coupling Agent (120° C.) Sequential Treatment)

A thermally conductive filler was produced as in Example 1, except that the amount of ammonium fluoride used in the fluorine treatment was changed to 0.1052 g. Table 2 shows the result of the evaluation of its hygroscopicity.

3. Example 3 (Fluorine (500° C.)→Silane Coupling Agent (120° C.) Sequential Treatment)

A thermally conductive filler was produced as in Example 1, except that the amount of ammonium fluoride used in the fluorine treatment was changed to 0.1753 g. Table 2 shows the result of the evaluation of its hygroscopicity.

4. Example 4 (Fluorine+Silane Coupling Agent Simultaneous Treatment (120° C.))

In a mortar, 0.0584 g of ammonium fluoride (ACS reagent, ≥98.0%, manufactured by Sigma-Aldrich Corporation) and 0.1 g of vinyltrimethoxysilane (Dynasylan 6490 manufactured by Evonik Degussa Japan Co., Ltd.) were added to 20 g of the magnesium oxide powder 1 (2.7 μm in average particle size) and mixed for 10 minutes. The resulting mixed powder was placed on a magnetic dish and then heat-treated in a dryer at 120° C. for 18 hours. The resulting fluorine and silane coupling agent-treated magnesium oxide powder was taken out of the dryer. Table 2 shows the result of the evaluation of its hygroscopicity.

5. Example 5 (Fluorine+Silane Coupling Agent Simultaneous Treatment (200° C.))

In a mortar, 0.0584 g of ammonium fluoride (ACS reagent, ≥98.0%, manufactured by Sigma-Aldrich Corporation) and 0.1 g of vinyltrimethoxysilane (Dynasylan 6490 manufactured by Evonik Degussa Japan Co., Ltd.) were added to 20 g of the magnesium oxide powder 1 (2.7 μm in average particle size) and mixed for 10 minutes. The resulting mixed powder was added to a heat-resistant container made of alumina, and the container was covered with a lid. After the heat-resistant container was placed in an electric furnace, the temperature in the furnace was raised to 200° C. at a rate of 4° C./minute and then held for 6 hours. Subsequently, the temperature in the furnace was cooled to room temperature at a rate of 4° C./minute, so that a fluorine and silane coupling agent-treated magnesium oxide powder was obtained. Table 2 shows the result of the evaluation of its hygroscopicity.

6. Example 6 (Silane Coupling Agent (120° C.)→Fluorine (200° C.) Sequential Treatment)

In a mortar, 0.1 g of vinyltrimethoxysilane (Dynasylan 6490 manufactured by Evonik Degussa Japan Co., Ltd.) was added to 20 g of the magnesium oxide powder 1 (2.7 μm in average particle size) and mixed for 10 minutes. The resulting mixed powder was placed on a magnetic dish and then heat-treated in a dryer at 120° C. for 18 hours. The resulting silane coupling agent-treated magnesium oxide powder was taken out of the dryer. Twenty g of the silane coupling agent-treated magnesium oxide powder was added to a heat-resistant container made of alumina. A platinum crucible containing 0.0584 g of ammonium fluoride (ACS reagent, ≥98.0%, manufactured by Sigma-Aldrich Corporation) was placed in the heat-resistant container containing the magnesium oxide powder. The heat-resistant container was then covered with a lid. After the heat-resistant container was placed in an electric furnace, the temperature in the furnace was raised to 200° C. at a rate of 4° C./minute and then held for 6 hours. Subsequently, the temperature in the furnace was cooled to room temperature at a rate of 4° C./minute, so that a fluorine and silane coupling agent-treated magnesium oxide powder was obtained. Table 2 shows the result of the evaluation of its hygroscopicity.

7. Example 7 (Silane Coupling Agent (120° C.)→Fluorine (120° C.) Sequential Treatment)

In a mortar, 0.1 g of vinyltrimethoxysilane (Dynasylan 6490 manufactured by Evonik Degussa Japan Co., Ltd.) was added to 20 g of the magnesium oxide powder 1 (2.7 μm in average particle size) and mixed for 10 minutes. The resulting mixed powder was placed on a magnetic dish and then heat-treated in a dryer at 120° C. for 18 hours. The resulting silane coupling agent-treated magnesium oxide powder was taken out of the dryer. In a mortar, 0.0584 g of ammonium fluoride (ACS reagent, ≥98.0%, manufactured by Sigma-Aldrich Corporation) was added to 20 g of the silane coupling agent-treated magnesium oxide powder and mixed for 10 minutes. The resulting mixed powder was placed on a magnetic dish and then heat-treated in a dryer at 120° C. for 18 hours. The resulting fluorine and silane coupling agent-treated magnesium oxide powder was taken out of the dryer. Table 2 shows the result of the evaluation of its hygroscopicity.

8. Example 8 (Fluorine+Silane Coupling Agent Simultaneous Treatment (120° C.))

A fluorine and silane coupling agent-treated magnesium oxide powder was obtained as in Example 4, except that the magnesium oxide 2 (1.0 μm in average particle size) was used instead of the magnesium oxide powder 1 (2.7 μm in average particle size). Table 2 shows the result of the evaluation of its hygroscopicity.

9. Comparative Examples 1 to 3 (Only Fluorine Treatment (500° C.)

Comparative Examples 1 to 3 were performed under the conditions shown below. Table 2 shows the results of the evaluation of the hygroscopicity.

Comparative Example 1: the same as Example 1, except that the silane coupling agent treatment is not performed.
Comparative Example 2: the same as Example 2, except that the silane coupling agent treatment is not performed.
Comparative Example 3: the same as Example 3, except that the silane coupling agent treatment is not performed.

10. Comparative Example 4 (Only Silane Coupling Agent Treatment (120° C.))

In a mortar, 0.1 g of vinyltrimethoxysilane (Dynasylan 6490 manufactured by Evonik Degussa Japan Co., Ltd.) was added to 20 g of the magnesium oxide powder 2 (1.0 μm in average particle size) and mixed for 10 minutes. The resulting mixed powder was placed on a magnetic dish and then heat-treated in a dryer at 120° C. for 18 hours. The resulting silane coupling agent-treated magnesium oxide powder was taken out of the dryer. Table 2 shows the result of the evaluation of its hygroscopicity.

TABLE 2

| | Treatment method | Mass increase (mass %) |
|---|---|---|
| Example 1 | F treatment (500° C.) → SC treatment (120° C.) | 8.0 |
| Example 2 | F treatment (500° C.) → SC treatment (120° C.) | 0.6 |
| Example 3 | F treatment (500° C.) → SC treatment (120° C.) | 0.6 |
| Example 4 | F treatment + SC treatment (120° C.) | 0.0 |
| Example 5 | F treatment + SC treatment (200° C.) | 0.1 |
| Example 6 | SC treatment (120° C.) → F treatment (200° C.) | 24 |

TABLE 2-continued

| | Treatment method | Mass increase (mass %) |
|---|---|---|
| Example 7 | SC treatment (120° C.) → F treatment (120° C.) | 24 |
| Example 8 | F treatment + SC treatment (120° C.) | 0.0 |
| Comparative Example 1 | F treatment (500° C.) | 45 |
| Comparative Example 2 | F treatment (500° C.) | 45 |
| Comparative Example 3 | F treatment (500° C.) | 45 |
| Comparative Example 4 | SC treatment (120° C.) | 45 |

11. Analysis of Surface of Magnesium Oxide Particles

Figure 1:
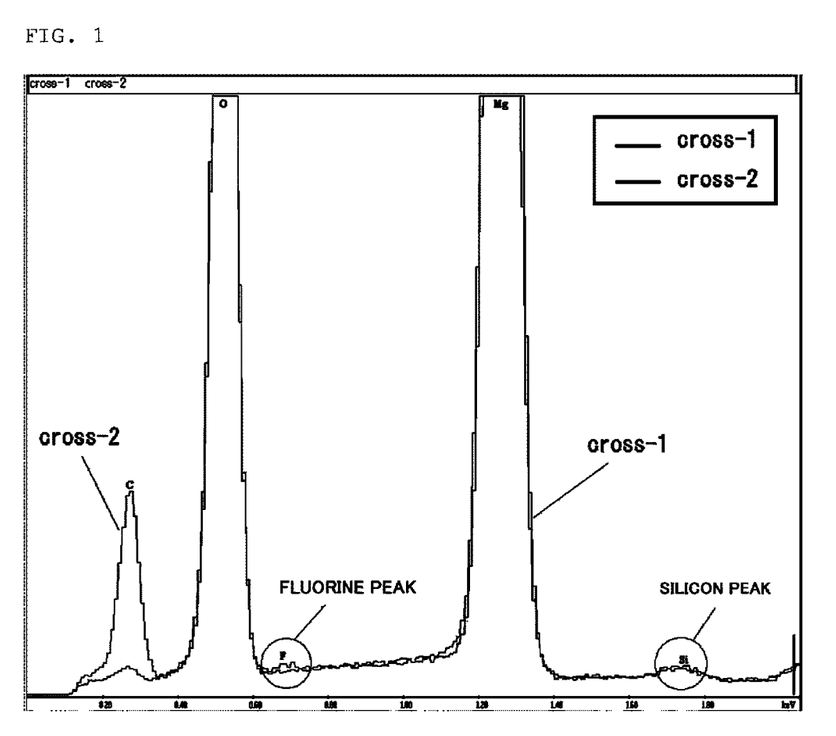
FIG. 1 is a graph showing the results of EDX measurement of particle A of Example 4.
Figure 2:
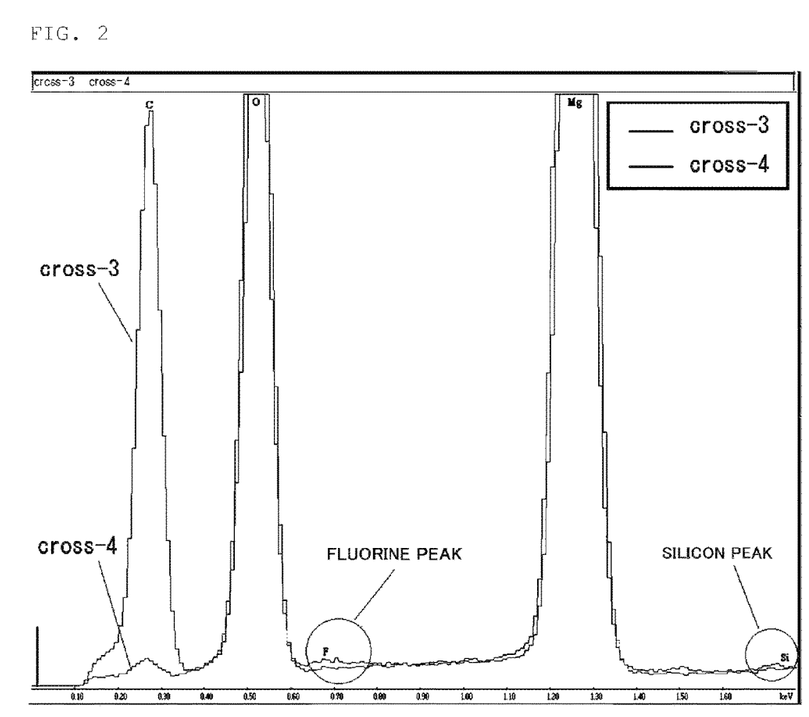
FIG. 2 is a graph showing the results of EDX measurement of particle B of Example 4.

Two particles (particles A and B) were taken out of the magnesium oxide powder of Example 4. Elemental analysis of the cross-section of each particle was performed by energy dispersive X-ray spectroscopy (EDX). The EDX measurement was performed using an energy dispersive X-ray analyzer (Genesis 4000 manufactured by EDAX Inc.) at an accelerating voltage of 10 kV. FIGS. 1 and 2 show the resulting spectra. FIGS. 1 and 2 show the results of the measurement of particles A and B, respectively. In the drawings, cross-1 and cross-4 indicate the results of the measurement of the inside of the cross-section, and cross-2 and cross-3 indicate the results of the measurement of the surface part.

The graph indicated by cross-2 in FIG. 1 and the graph indicated by cross-3 in FIG. 2 show that a fluorine peak derived from the halogen compound and a silicon peak derived from the silane coupling agent were detected from all of particles A and B. It has, therefore, been found that a coating layer including the halogen compound and the silane coupling agent is formed on the surface of the magnesium oxide particles.

The invention claimed is:

1. A magnesium oxide material comprising a product obtained by treating magnesium oxide with a halogen compound and a silane coupling agent,
wherein the magnesium oxide material has a halogen compound content of 1 ppm to 20,000 ppm.

2. The magnesium oxide material according to claim 1, which shows a mass increase of 25% by mass or less after stored at a temperature of 121° C. and a humidity of 100% for 24 hours, wherein the mass increase is expressed by formula (1):

mass increase={(an increase in the mass of the magnesium oxide material after the storage)/(the mass of the magnesium oxide material before the storage)}×100(%).

3. A thermally conductive filler comprising the magnesium oxide material according to claim 1.

4. A thermally conductive resin composition comprising: a resin; and the thermally conductive filler according to claim 3 mixed in the resin.

5. The magnesium oxide material according to claim 1, wherein the halogen compound is a fluoride.

6. A magnesium oxide material comprising magnesium oxide and a coating layer that is provided on a surface of the magnesium oxide and comprises a halogen compound and a silane coupling agent,
wherein the magnesium oxide material has a halogen compound content of 1 ppm to 20,000 ppm.

7. The magnesium oxide material according to claim 6, which shows a mass increase of 25% by mass or less after stored at a temperature of 121° C. and a humidity of 100% for 24 hours, wherein the mass increase is expressed by formula (1):

mass increase={(an increase in the mass of the magnesium oxide material after the storage)/(the mass of the magnesium oxide material before the storage)}×100(%).

8. A thermally conductive filler comprising the magnesium oxide material according to claim 6.

9. A thermally conductive resin composition comprising: a resin; and the thermally conductive filler according to claim 8 mixed in the resin.

10. The magnesium oxide material according to claim 6, wherein the halogen compound is a fluoride.

11. A method of producing a magnesium oxide material, the method comprising:
a step comprising preparing a magnesium oxide powder;
a halogen compound treatment step comprising subjecting the magnesium oxide powder to a surface treatment with a halogen compound; and
a silane coupling agent treatment step comprising subjecting the magnesium oxide powder to a surface treatment with a silane coupling agent,
wherein the magnesium oxide material has a halogen compound content of 1 ppm to 20,000 ppm.

12. The method according to claim 11, wherein the silane coupling agent treatment step is performed after the halogen compound treatment step.

13. The method according to claim 11, wherein the halogen compound treatment step and the silane coupling agent treatment step are performed simultaneously.

14. The method according to claim 11, wherein the halogen compound is a fluoride.

* * * * *